May 5, 1953 K. G. STERN Re. 23,653

ELECTROPHORETIC LIQUID ANALYSIS APPARATUS HAVING A DIAPHRAGM AND CYLINDRICAL LENS IN THE OPTIC PATH

Original Filed April 3, 1947 6 Sheets-Sheet 1

INVENTOR
KURT G. STERN
BY Herman L. Gordon
ATTORNEY

INVENTOR
KURT G. STERN
BY Herman L. Gordon
ATTORNEY

ELECTROPHORETIC LIQUID ANALYSIS APPARATUS HAVING A DIAPHRAGM AND CYLINDRICAL LENS IN THE OPTIC PATH

Original Filed April 3, 1947 6 Sheets-Sheet 3

INVENTOR
KURT G. STERN
BY Herman L. Gordon
ATTORNEY

ELECTROPHORETIC LIQUID ANALYSIS APPARATUS HAVING A DIAPHRAGM AND CYLINDRICAL LENS IN THE OPTIC PATH

Original Filed April 3, 1947 6 Sheets-Sheet 4

EXPERIMENTAL AND STANDARD CURVES SUPERIMPOSED

STANDARD CURVE

EXPERIMENTAL CURVE

INVENTOR
KURT G. STERN
BY Herman L. Gordon
ATTORNEY

ELECTROPHORETIC LIQUID ANALYSIS APPARATUS HAVING A DIAPHRAGM AND CYLINDRICAL LENS IN THE OPTIC PATH

Original Filed April 3, 1947 6 Sheets-Sheet 5

INVENTOR
KURT G. STERN
BY
Herman L. Gordon
ATTORNEY

INVENTOR
KURT G. STERN
BY
Herman L. Gordon
ATTORNEY

Reissued May 5, 1953

Re. 23,653

UNITED STATES PATENT OFFICE 23,653

ELECTROPHORETIC LIQUID ANALYSIS APPARATUS HAVING A DIAPHRAGM AND CYLINDRICAL LENS IN THE OPTIC PATH

Kurt G. Stern, New York, N. Y.

Original No. 2,495,297, dated January 24, 1950, Serial No. 739,178, April 3, 1947. Application for reissue November 20, 1952, Serial No. 321,750

15 Claims. (Cl. 88—14)

Matter enclosed in heavy brackets [ ] appears in the original patent but forms no part of this reissue specification; matter printed in italics indicates the additions made by reissue.

This invention relates to apparatus for the optical analysis of liquids, and more particularly, to means for studying and analyzing solutions by the "moving boundary" method.

A main object of the invention is to provide a novel and improved apparatus for the analysis of colloidal and other mixtures of biological and industrial interest, wherein the space requirements and weight of the apparatus are substantially minimized, the construction, installation and operation of the equipment are simplified, and wherein the optical system employed is maintained under conditions of low humidity, whereby fogging of the optical components is avoided.

A further object of the invention is to provide an improved apparatus for the optical analysis of colloidal and other mixtures by the "moving boundary" method, wherein a single cooling device is employed for multiple purposes in connection with the operation of the apparatus.

A still further object of the invention is to provide in an apparatus for the optical analysis of liquids a simple means for selectively producing any one of a plurality of different types of refractive index gradient curve representations, such as a light line on a dark background, a dark line on a light background, or combined dark and light areas whose common boundary is curved in accordance with the nature of the liquid being analyzed, each of the curve representations being fundamentally the same, but each under certain distinct conditions being best adapted to provide information of maximum clarity.

A still further object of the invention is to provide an improved apparatus for the optical analysis of liquids, said apparatus being provided with a novel type of angularly adjustable diaphragm which is remotely controlled, for the adjustable projection of refractive index gradient curves upon a screen, or photographic plate or film, and to greatly simplify the evaluation of the results obtained by a system of standardized diagrams imaged simultaneously with the experimental curves.

A still further object of the invention is to provide an improved apparatus which may be employed in the optical analysis of liquids where the liquid is subjected to electrical or other force gradients, where phenomena such as diffusion, adsorption, or the like may be studied, or for the determination of the refractive indices of solutions and other liquids.

Further objects and advantages of the invention will become apparent from the following description and claims, and from the accompanying drawings, wherein:

Figure 8b is a view showing a standard curve for normal blood serum, which may be employed as a reference device in the analysis of serum of the type considered in Figure 8a.

Figure 1:
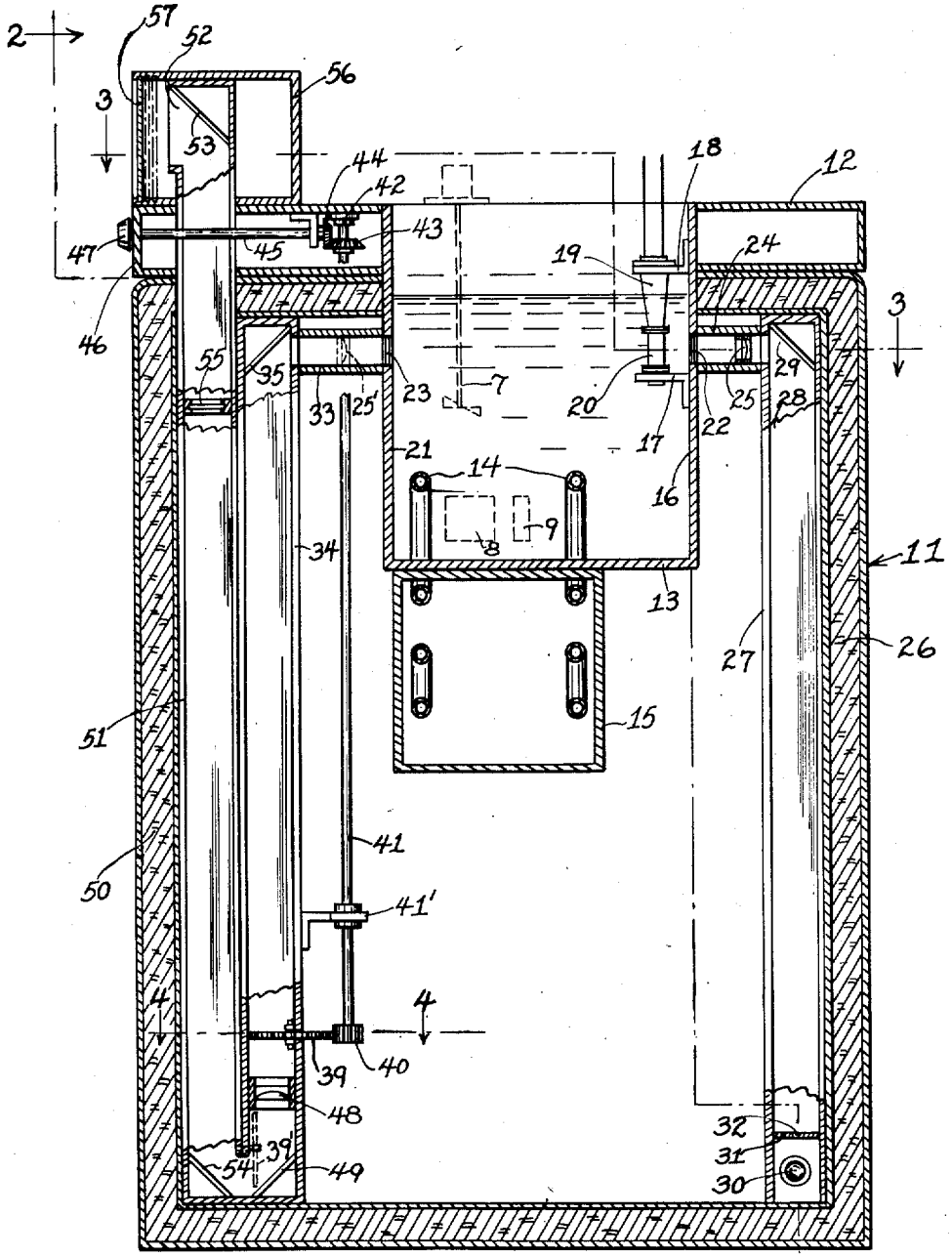
Figure 1 is a vertical longitudinal cross-sectional view of an apparatus constructed in accordance with the principles and method of the present invention, wherein, for purposes merely of illustration, the apparatus is arranged for the analysis of a liquid by electrophoretic treatment thereof.

For purposes of illustration of the principles and methods of the present invention, specific reference will now be made to the art of electrophoresis, wherein the invention has been found to be of great practical utility.

It has been known for over a hundred years, since the experiments of Reuss, that colloidal particles, both organic and inorganic in nature, are endowed with an electrical charge on their surfaces and that they will migrate to the electrode of opposite sign of charge in an electrical field of suitable strength. Following numerous more-or-less successful attempts by such pioneers as Hardy, Pauli, and Michaelis, to utilize this phenomenon, called "electrophoresis" or "cataphoresis," for the study of systems of biological interest, and of Count Schwerin and others for various industrial purposes, the method has made considerable progress in recent years, largely due to the work of A. Tiselius and of H. Theorell in Sweden. When the colloid under study is molecularly dispersed in the form of a sol, the migration of the colloid particles is followed by observing, by analytical or optical means, the progress of the leading or trailing boundary of the sol, stratified under a suitable solvent. The historical development of this so-called "moving boundary" method of electrophoresis has been traced, for example by K. G. Stern in the Annals of the New York Academy of Sciences, vol. 39, page 147 (1939). When the particles under study are not in solution, as in the case of crystals or intact blood cells, their migration towards the electrodes may be directly observed and measured by means of the "microscopic" method of electrophoresis, as employed in recent years by H. A. Abramson and his colleagues. For a detailed account of both methods and the work done with them reference is made to the monograph by H. A. Abramson, L. S. Moyer, and M. H. Gorin, "Electrophoresis of Proteins," Reinhold Publishing Company, New York, 1942.

Electrophoretic analysis and separation of complex colloid mixtures, such as blood serum, has, within the last few years, become an important tool in biochemical, biological, and medical research laboratories both in this country and abroad. A review paper, "Electrophoresis in medicine," by K. G. Stern and M. Reiner, Yale Journal of Biology and Medicine, vol. 19, page 67 (1946), lists over one hundred recent publications in this field alone and indicates that the only obstacle in the way of a further rapid expansion of this technique in medical research and clinical diagnosis is the lack of simple and relatively inexpensive apparatus.

The only equipment commercially produced in the United States (and described in some detail by L. G. Longsworth, "Optical methods in electrophoresis," Industrial and Engineering Chemistry, Analytical Edition, vol. 18, page 219 (1946)) is not only expensive but has floor space and floor load requirements (it is about 20 feet long and weighs, with its steel beam and concrete piers, several tons) which can only rarely be met even by the larger research institutions without providing special laboratories. Furthermore, it is supplied in individual parts which must be assembled and adjusted by the users, who also have to take care of the casting of the concrete piers and of the installation of the long steel beam. After being set up properly by someone with expert knowledge in this field, the instrument requires a highly trained and skilled operator and expert personnel for its maintenance and repairs. Due to its stationary nature, the apparatus can be returned to the factory for replacements, etc., only with great difficulty. No service is provided by the manufacturer on the location of the equipment. A photographic darkroom and a separate refrigerator are required in conjunction with the use of the apparatus. After the electrophoretic diagrams have been recorded by an elaborate mechanical scanning device, they must be projected for enlargement. The enlarged diagrams or tracings must then be subjected to analysis with a planimeter, and only after lengthy computations, preferably with a calculating machine, are the final data obtained. Inasmuch as the solutions to be analyzed must be equilibrated against suitable salt solutions by dialysis at low temperature, about three to four days pass on the average after receipt of the specimen before the results of the examination of blood serum or other biological fluids are available to the physician or investigator desiring the information. Frequently, this long period lessens greatly the value of this physical tool for the diagnosis and course of treatment of certain diseases.

It will be shown that the apparatus and technique herein described eliminate most of the shortcomings of the conventional equipment described above. It will also be shown that this is accomplished without undue sacrifice as to reliability or accuracy of the results obtained.

The outstanding features of an apparatus constructed in accordance with the present invention are briefly as follows: The entire apparatus is mounted on and in a refrigerated compartment, such as the interior of a conventional, commercially manufactured home refrigerator, preferably of the gas type. The optical components are located in the refrigerator interior where they are in a dehumidified atmosphere and are thereby protected against the condensation of moisture on the glass parts thereof, such as on the lenses, mirrors and windows. Such condensation is a constant source of difficulty in the case of the conventional present equipment, and which renders the operation of said present equipment during hot and humid weather almost impossible unless the entire laboratory is air-conditioned. By "folding" the optical system with the aid of several plane mirrors the floor space requirements of the apparatus are reduced from an area of about 20 by 4 feet, for the present equipment, to that occupied by the refrigerator, e. g., approximately 28 by 25 inches. The total weight is reduced from about four to five tons down to about 250 pounds. Furthermore, a considerable portion of the refrigerator space remains available for the storage of specimen samples and for the equilibration of the solutions through dialysis prior to electrophoresis. This obviates the need for a separate refrigerator. A thermostatically controlled bath is provided which contains the electrophoresis cell and maintains it at its optimum temperature (near zero degree centigrade). The same refrigerator compressor is utilized for maintaining the optimum temperature of the bath, for the low temperature storage of biological specimens, for the dehumidification of the optical components, and for general refrigeration purposes (at about 9 to 12 degrees centigrade). All of the parts of the apparatus are readily accessible for repair or adjustment. The optical components are focussed and adjusted at the factory so that the apparatus can be placed in operation immediately upon receipt by merely connecting it to the necessary sources of electrical power and gas. There is only one manually adjusted optical component, namely, the angularly movable (bar) diaphragm. All electrical controls are centralized on a conveniently located panel at the top portion of the apparatus. Instead of recording the electrophoretic diagrams by a mechanical scanning device, they are imaged directly in the form of a complete curve on a graduated screen by an optical integrating system of considerable flexibility. The curves may be traced directly or they may be photographed on sensitized film or paper, preferably of a type which is insensitive to diffuse daylight, thereby eliminating the need for a separate darkroom.

For ordinary clinical or industrial routine examinations, the tedious and *lengthy* [lengthly] manipulations and computations required heretofore by the use of conventional apparatus are avoided by furnishing standard patterns or curves with the improved apparatus, which make it possible to interpret the significance of the observed electrophoretic diagrams by direct comparison. The manipulations inherent in the use of the improved apparatus lend themselves readily to strict standardization, so as to make data obtained in different laboratories directly comparable, and insuring reproducibility of the results. The apparatus may be safely entrusted to a laboratory technician after brief instruction, thus eliminating the need for a highly trained and skilled operator. The operator is further freed for other duties in the laboratory by making the entire operation of the instrument semi-automatic.

By using suitable cells, the same apparatus may be used for the optical analysis of electrophoretic patterns, for the mechanical separation of colloid mixtures, for the measurement of diffusion rates, for the optical study of adsorption processes, for the measurement of the refractive index of solutions, and any other processes or phenomena which give rise to refractive index differences or gradients.

The range of application of the apparatus may be further extended to the study of opalescent or colored systems by the provision of an infra-red radiation source and an infra-red-sensitive screen as the viewing device or recording detector.

Referring to the drawings, 11 designates a refrigerator cabinet, preferably of the household type employing illuminating gas, so that vibration caused by the operation of the refrigerator will be eliminated and disturbances of the electrophoresis, diffusion, or other liquid treatment by mechanical vibration such as those frequently caused by mechanical compressor units will be avoided. Mounted on the top of the cabinet 11 is a housing 12 for electrical components, and secured thereto and depending therefrom through the top wall of cabinet 11 into the interior of the cabinet is a tank 13, which contains the constant temperature bath. Tank 13 preferably includes the upper loops 14, 14 of the evaporator coils of the refrigerator, the remaining coil loops being contained in a low temperature compartment 15 supported in the cabinet beneath tank 13. The top of the tank is open.

Secured to a side wall 16 of tank 13 by suitable brackets, shown at 17 and 18, is the cell 19, having a window portion 20, which contains the liquid to be analyzed. Cell 19 may be an electrophoresis cell, a diffusion cell, an adsorption cell, or another suitable vessel containing liquid to be analyzed. Specific cells will be later described, although the present invention is not primarily concerned with the detailed structure thereof except insofar as it forms a part of the optical system employed herein.

By way of example, cell 19 is illustrated in Figure 1 as an electrophoresis cell.

Side wall 16 of tank 13 and the opposite side wall 21 thereof are provided with transparent windows, shown respectively at 22 and 23, which are in alignment with cell window portion 20. Secured to the outside of [all] *wall* 16 and communicating with window 22 is a tube 24 which contains a lens 25. Communicating with tube 24 and secured in the refrigerator interior adjacent a side wall 26 of the cabinet 11 is a vertical tube 27, which may comprise a metal channel to the normally open side of which is secured a transparent wall 28 of glass or transparent plastic material. In the upper end portion of tube 27 opposite the opening of tube 24 is an angled plane mirror 29, arranged to reflect a beam of light travelling axially in tube 27 into axial alignment in tube 24. At the bottom portion of tube 27 is a light source 30, and positioned above and adjacent to said source is a plate 31 formed with a slit 32. Light source 30 is preferably of the type having a linear filament so that it may be considered as a line source, in which case slit 32 may be relatively large in width. Otherwise, slit 32 is relatively narrow, so that light emerging therefrom will constitute, in effect, a narrow linear divergent beam.

Secured to the outside of wall 21 and communicating with window 23 is a tube 33 which communicates with a vertical tube 34 similar in general construction to tube 27. In the upper end of tube 34 opposite the opening of tube 33 is an angled plane mirror 35 arranged to reflect a beam of light travelling axially in tube 33 downwardly and axially in tube 34. The lower portion of tube 34 is horizontally slotted at its front and side walls, as shown at 36 and 37, and rotatively mounted at 38 in a corner of the tube is a disc member 39 positioned in said slots, whose plane is normal to the axis of the tube and whose disc surface is arranged to sweep through a substantial portion of the internal cross-sectional area of said tube. A portion of the disc member 39 protrudes outside the tube 34. The periphery of the disc member 39 is formed with gear teeth, and meshing with the gear teeth of the disc member outside of tube 34 are the gear teeth of a pinion gear 40 carried on a vertical shaft 41 journalled in the cabinet 11 adjacent tube 34 on a bearing bracket 41' and projecting through the top wall of the cabinet into housing 12, where it is also rotatively supported at the top wall of said housing by a bearing 42. The upper portion of shaft 41 carries a bevel gear 43 which is in mesh with a bevel gear 44 carried on a shaft 45 journalled in housing 12, and projecting through a control panel 46 forming the outer wall of housing 12. A knob 47 is secured to the outer end of shaft 45. Rotation of knob 47 causes rotation of disc member 39 through the medium of the bevel gears 44 and 43 and the mesh engagement of pinion gear 40 with the gear teeth on the periphery of the disc member.

The rigid remote control mechanism described in the foregoing may be replaced by a flexible shafting arrangement of the conventional type. Furthermore, it may be found advantageous to position the disc member vertically between the mirrors 49 and 54 in the lower left portion of Figure 1, as shown in dotted view at 39'.

Positioned in the tube 34 below disc member 39 is a camera lens assembly 48. Mounted in the bottom end of tube 34 is a 45° angled plane mirror 49. Mounted in cabinet 11 adjacent the side wall 50 thereof and forming a unitary assembly with tube 34 is a vertical tube 51, having the same general structure as vertical tube 27. Vertical tube 51 projects upwardly through the top wall of cabinet 11 and through the housing 12. The top end of said vertical tube 51 is formed with a laterally facing open head 52, in the upper corner portion of which is mounted a 45° angled mirror 53 which is positioned so as to receive light from an opposite angled mirror 54 in the bottom end of tube 51. The 45° angled mirror 54 at the bottom end of tube 51 is positioned opposite the angled mirror 49 in the bottom end of tube 34, the tube walls being open between mirrors 49 and 54 so that light may pass from mirror 49 to mirror 54 for subsequent reflection upwardly in tube 51. Positioned in the upper portion of tube 51 is a cylindrical lens 55, arranged to spread the light beam travelling upwardly in tube 51 in a vertical plane transverse to the plane of the optical system. The cylindrical lens 55 does not appreciably alter the beam in the plane of the system.

Overlying head 52 is a housing 56 provided with a translucent viewing screen 57 of ground glass or the like, positioned in front of mirror 53 and arranged to receive the light reflected therefrom.

Screen 57 is supported in vertical guideways 58, 58, formed in the side walls of housing 56, and may be removed through a slot 59 formed in the top wall of the housing. Formed in the top and bottom walls of the housing 56 inwardly adjacent screen 57 are horizontal guideways 60 and 61 for the reception of photographic plates and for reference or standard plates such as will be subsequently described. Vertical slots 62 and 63 are formed in a side wall of housing 56 through which said auxiliary plates may be passed into their respective guideways.

Figure 4:
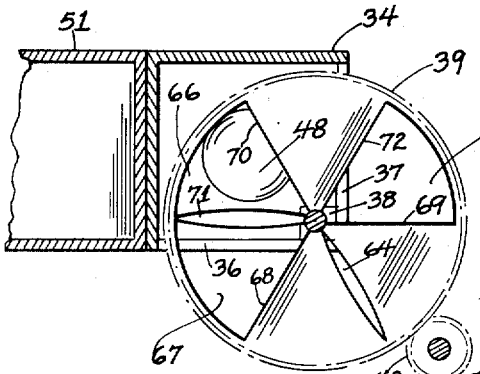
Figure 4 is an enlarged cross-sectional detail view taken on line 4—4 of Figure 1.
Figure 5:
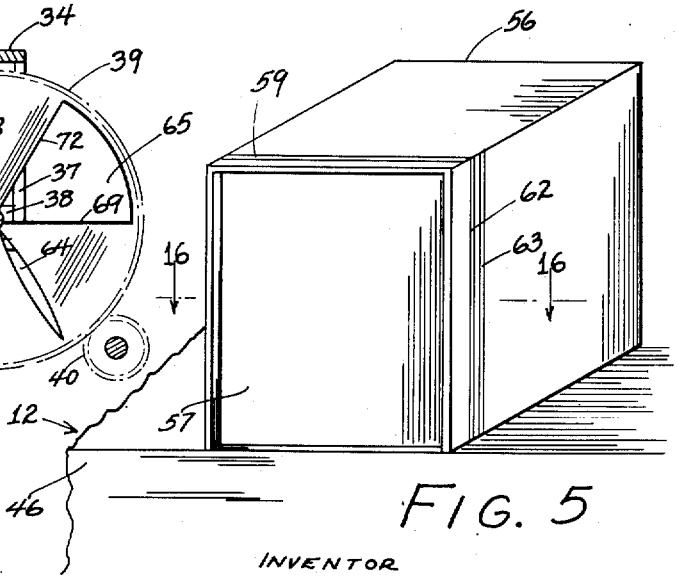
Figure 5 is an enlarged perspective detail view of the viewing screen housing employed in the apparatus of Figure 1.

As shown in Figure 4, disc member 39 is formed with a plurality of radial open portions, shown respectively at 64, 65, 66 and 67. The solid portion of the disc member between the radial edges 68 and 69 subtends an arc of 120°. Open portion 64 comprises a spindle-shaped radial slot which bisects the 120° angle between radial edges 68 and 69. Open portions 66 and 67 together subtend an arc of 120°, and bisecting the 120° angle between the upper radial edge 70 of open portion 66 and the lower radial edge 68 of open portion 67 is a spindle-shaped radial spoke 71, similar in shape to radial slot 64 and angularly spaced 120° clockwise therefrom, as viewed in Figure 4. Spaced 120° clockwise from radial spoke 71 is the radial upper edge 72 of open portion 65. The radial elements 64, 71 and 72 are therefore spaced 120° apart on the disc member 39, and, as shown in Figure 4, are of sufficient radial extent to sweep across substantially the entire field of lens assembly 48 as disc member 39 is rotated by pinion gear 40. The solid parts of the disc member 39 are opaque.

The radial slot 64 and the radial bar 71 may have parallel straight sides instead of being spindle-shaped, but the spindle shape is preferred, for reasons to be subsequently stated.

Instead of being actual apertures in the disc member 39, the portions 64, 65, 66 and 67 may be merely transparent windows, since their function is only to transmit light. The transparent windows may be formed by any suitable process, such as by stencilling, spraying or sputtering paint or metal, or by any well known method of depositing opaque material on a plate, such as by photographic methods, the opaque portions being deposited on an otherwise transparent disc while the portions which are to remain transparent are covered by a suitable mask or negative. The transparent disc is preferably formed of thin clear colorless plastic, permitting the gear teeth on its periphery to be integral parts of the disc.

In the optical system above defined, the light coming from the linear source 30 passes upwardly through tube 27 and is reflected by the mirror 29 to the lens 25. The light rays, which are at first confined to a relatively flat beam normal to the plane of the paper, as viewed in Figure 1, spread out and pass through lens 25 and window 22, illuminating fully the glass cell window portion 20 immersed in the tank 13. The cell may be either an electrophoresis, diffusion or adsorption cell, or it may be a small hollow glass prism containing a solution whose refractive index is to be measured. The light rays leave tank 13 through window 23, enter tube 33, and are reflected downwardly in tube 34 by angled mirror 35, through the diaphragm disc member 39, and to the camera lens 48. From there the light passes to the bottom angled mirror 49 from which it is reflected to the opposing angled mirror 54, and thence upwardly in tube 51 through the cylindrical lens 55. The light passes through cylindrical lens 55 and is reflected from angled mirror 53 onto the viewing screen 57 or onto a photographic plate positioned adjacent thereto.

The focussing conditions of the system are as follows: the image of the light source 30, which is preferably a single straight tungsten filament, is focussed and projected by the lens 25 into the plane of the adjustable disc diaphragm 39. The camera lens 48, in turn, is focussed on the cell window portion 20, containing the liquid under study, and projects its image at approximately double magnification onto the viewing screen 57, or a photographic plate. In planes parallel to the plane of the system the plano-cylindrical lens 55 does not affect the path of the light appreciably; in a plane normal to the plane of the system it forms a conjugated system with the camera lens 48, jointly focussed on the plane of the disc diaphragm 39. In the alternative arrangement, where the disc diaphragm is situated between mirrors 49 and 54, the cylinder lens 55 alone is focussed on the disc 39.

The purpose of the optical arrangement outlined above is to image on the viewing screen or photographic plate of the apparatus all refractive index gradients existing in the cell 20 as the result of electrophoresis, diffusion or adsorption processes, in the shape of a continuous curve, the number of maxima of which indicates the number of components present in the liquid under study, the shape of which is a function of the definition of the solute-solvent boundaries, and the area under which is proportional to the relative concentration of the individual components.

The focal lengths and the distances of the various optical elements are chosen so as to yield a vertical magnification ratio of about 2:1 and a lateral magnification of about 20:1. The size of the illuminated field on the screen is about 10 by 10 centimeters. The fully resolved refractive index pattern or curve obtained in a practical embodiment of a system as above described covers a maximum area of about 10 by 6 centimeters. This size is ample for direct observation and for manual tracing of the pattern appearing on the viewing screen. In order to obtain satisfactory results and to avoid distortions due to imperfections in the various optical elements, the lenses employed should be chromatically and spherically corrected as well as free from striations or zonal errors; however they need not be free of coma. The windows 22 and 23 should be plane and polished, made from selected plate glass and free from striations. The mirrors should be first-surface mirrors on optically flat glass plates and selected so as not to introduce any distortion. A fully corrected optical system yields a flat or very nearly flat "base" line on the viewing screen in the absence of refractive index gradients in the cells. The cells themselves should preferably be made of sinterfused, plane and polished glass flats and should be free from striations.

An alternative arrangement which may be employed comprises dividing the lens 25 into two elements, one lens element being located in tube 24, as at 25, and the other lens element being located in tube 33, as shown in dotted view in Figure 1 at 25'. In this arrangement the lens elements 25 and 25' are so arranged that the light rays between them, passing through the tank 13 and the cell window portion 20, are rendered parallel. The cell window portion 20 in the said alternative embodiment therefore is not required to be as close to the window 22 as in the former arrangement, due to the convergent nature of the light rays in said former arrangement.

The rotatively adjustable disc diaphragm member 39 allows the angle formed by the spoke bar 71, slot 64 or straight edge 72 to be manually varied with respect to the normal plane of the system, i. e., a vertical plane normal to the plane of the paper, as viewed in Figure 1. This adjustment controls the size of the refractive index gradient maxima of the curve or pattern visible on the viewing screen.

The elements 64 and 71 are preferably made spindle-shaped rather than with parallel sides in order to maintain the thickness of the curved line viewed on the screen substantially constant independently of the steepness of the refractive index gradient in the cell. The reason for this is that the thickness of the curve, as measured vertically to the cell axis, is constant over the entire length of the curve. This causes the width of the curve, as measured at right angles to itself, to become much smaller in the steep regions rather than in the flat regions of the curve. By using a spindle-shaped slit or bar and adjusting the optical elements in such a manner as to project the normal slit or light source image on one tip and the most strongly deviated slit image on the other tip of the spindle-shaped diaphragm, the thickness of the curve as projected on the screen becomes substantially uniform. In instances where curves with multiple peaks of different heights are encountered this expedient is, of course, effective only with regard to the thickness of the curve at the highest peak or maximum. In Figure 4 the maximum width of the spoke 71 and the slot 64 is somewhat exaggerated in order to facilitate illustration thereof. This problem is not encountered where the focussed source beam intersects the radial diaphragm edge 72, so that no such compensation is required where said edge is employed as the intersecting diaphragm element.

It is contemplated within the scope of the present invention to utilize infra-red radiation as the source medium for the optical examination of liquid systems which are too opalescent or strongly colored for study with visual light. While a tungsten lamp radiates appreciably in the far red and near infra-red region of the spectrum, it may be replaced by more intense infra-red radiators, e. g., a Nernst burner or a Globar source as used in infra-red spectrometers. The detection of the radiation on the viewing screen of the apparatus may be accomplished by the use of suitable infra-red excitable phosphors or by suitable electronic devices.

The front wall of tank 13 is preferably formed of a colored transparent material, such as red transparent plastic sheet material, shown at 13', permitting observation of the interior of the tank without admitting disturbing side light.

There is preferably mounted in the tank a suitable stirrer driven by a motor secured to the top of the tank; also a heating unit to counteract the cooling effect of the evaporator coils 14 so as to maintain the water in the tank at the optimum temperature for electrophoresis experiments, namely, slightly above the freezing point, and a suitable thermostatic switch for controlling the operation of said heating unit. In Figure 1, the stirrer is shown in dotted view at 7, the heating unit is shown at 8, and the thermostatic switch is shown at 9.

In operation, the main chamber of the refrigerator, containing the optical system, is dehumidified by the condensation of water vapor on the lower loops of the evaporator coils. It has been found to be of further advantage, to enhance this dehumidification of the refrigerator main chamber, to place trays containing a suitable hygroscopic agent, such as calcium chloride, in the freezing compartment 15. In this way, the interior humidity of the refrigerator chamber is kept at zero at all times, irrespective of the temperature of the evaporating coils. By placing the hygroscopic agent in the freezing compartment, the agent is cooled and thus made more efficient in binding water vapor.

Figure 6:
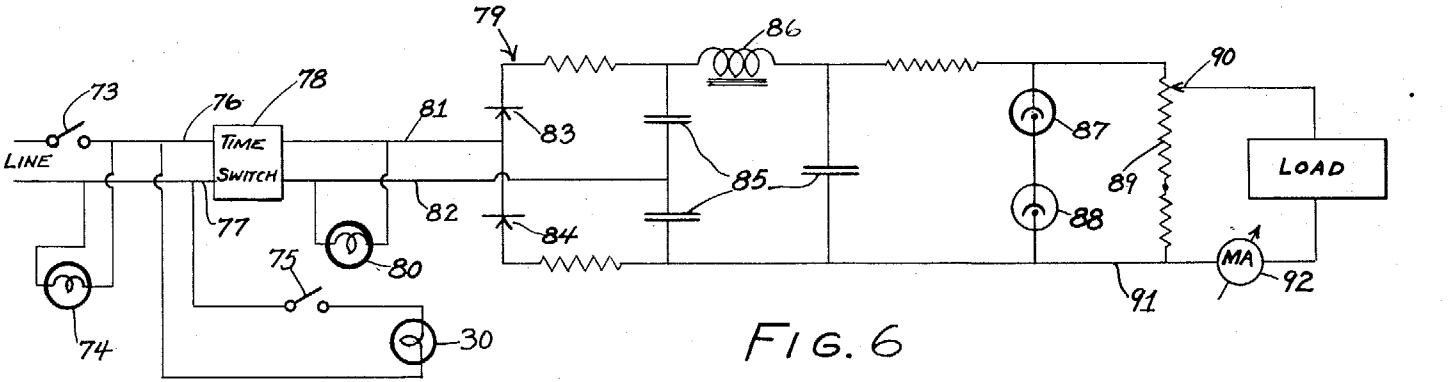
Figure 6 is a schematic wiring diagram of the electrical circuit employed in the electrophoresis arrangement of Figure 1.
Figure 7:
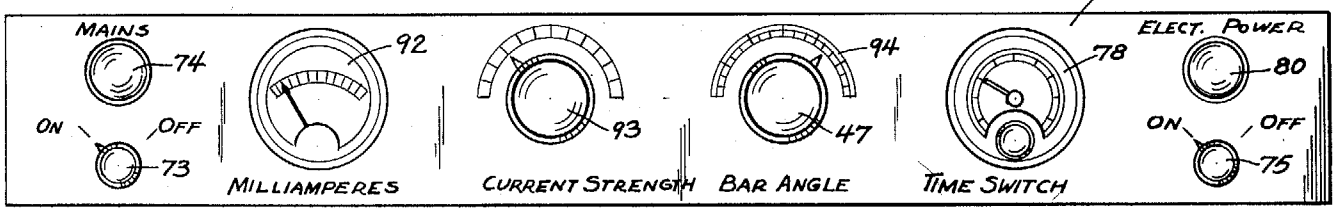
Figure 7 is an enlarged front elevational detail view of the control panel of the apparatus of Figure 1.

Figure 6 discloses a schematic diagram of the electrical circuit employed for electrophoresis in the apparatus of Figure 1. Designated at 73 is a line switch and connected across the line beyond the switch is a pilot lamp 74. The energization of the light source 30 is controlled by a switch 75 connected in series with said source 30 and the line. The line wires 76 and 77 are connected through a conventional manually adjustable time switch 78 to the rectifying pack, shown generally at 79, a signal lamp 80 being connected across the input wires 81 and 82 of said pack. The rectifying pack 79 is conventional in design and includes rectifiers 83 and 84, filter condensers 85, a filter choke 86, and voltage regulator tubes 87 and 88, series-connected across the output wires of the pack so as to provide constant direct current voltage across a potentiometer 89 having a manually adjustable tap connection 90. The electrophoresis cell electrodes are connected respectively to tap connection 90 and the zero voltage wire 91 of the rectifier pack, a milliameter 92 being connected in series with the load. The adjustment of tap connection 90 is controlled by a knob 93 on control panel 46. The elements above described are mounted in the housing 12 and are respectively controlled and observed on the control panel 46, as shown in Figure 7.

The knob 47, which controls the angle of the adjustable diaphragm, has associated with its pointer on the control panel 46 a scale 94, calibrated in degrees of rotation of the diaphragm, so that predetermined settings of the diaphragm may be readily produced.

Figure 8C:
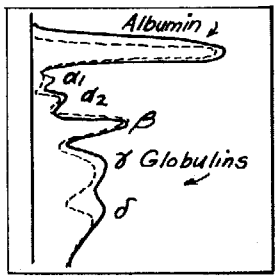
Figure 8c is a view showing the experimental curve of Figure 8a superimposed on the reference curve of Figure 8b, illustrating the simplicity of making an instantaneous comparison of the two curves by the apparatus of the present invention.
Figure 8B:
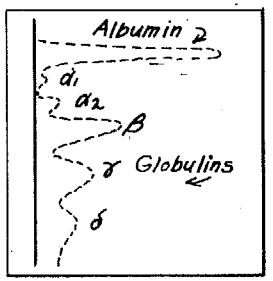
Figure 8A:
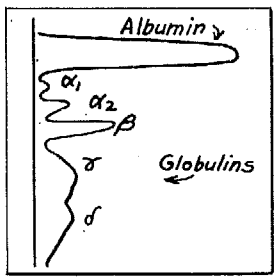
Figure 8a is a view illustrating a typical experimental curve obtained in the analysis of blood serum of electrophoresis, employing the apparatus of Figure 1.

Figure 8a illustrates a typical experimental curve obtained on screen 57 in the analysis of a sample of blood serum. Figure 8b illustrates a standard curve for normal blood serum. Such standard curves are carried on transparent plates adapted to be inserted into the housing 56 through slot 63 so as to be positioned behind the screen 57. When this is done, screen 57 will show the experimental curve in superposed relationship with the experimental curve, as illustrated in Figure 8c. This affords a convenient comparison of the experimental curve with the standard curve for a given liquid under study.

Figure 9:
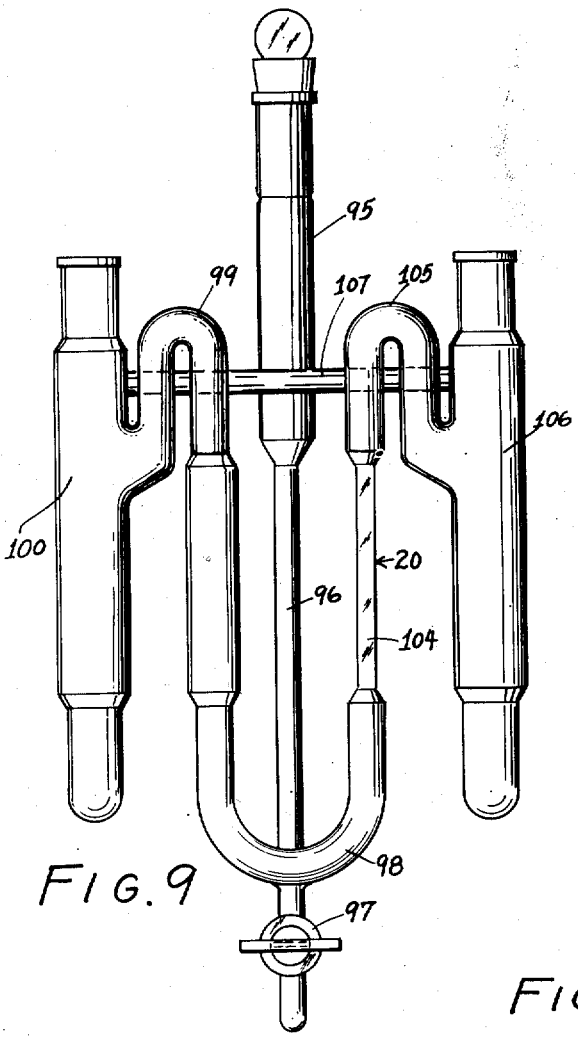
Figure 9 is a front elevational view of an electrophoresis cell which may be employed with the apparatus of the present invention.
Figure 10:
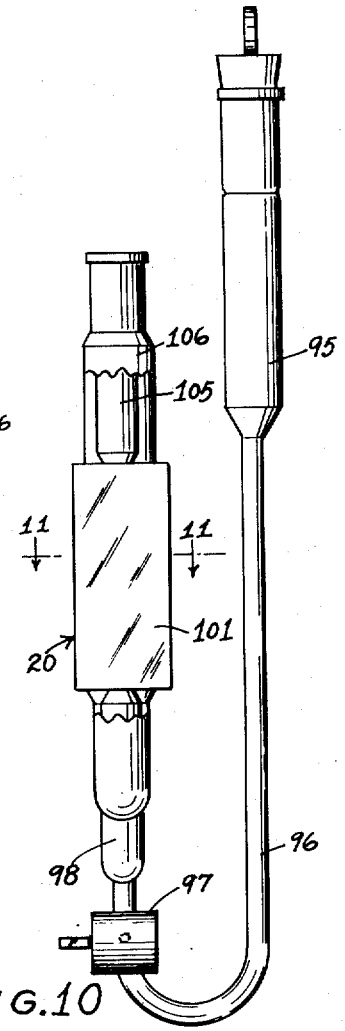
Figure 10 is a side elevational view, partly broken away to show structural details, of the electrophoresis cell of Figure 9.
Figure 11:
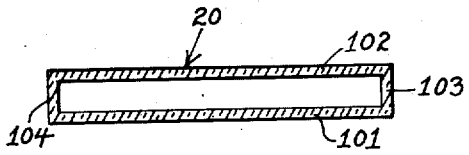
Figure 11 is an enlarged cross-sectional detail view taken on line 11—11 of Figure 10.

Figures 9, 10 and 11 illustrate an electrophoresis cell which may be employed with the apparatus of the present invention. The cell comprises a reservoir portion 95 connected by a conduit 96 through a valve 97 to the bottom of a U-shaped vessel 98, one arm of which is connected by a conduit 99 to one of the electrode chambers 100. The other arm includes the hollow cell window 20, which, as shown in Figures 10 and 11, comprises closely spaced, flat, relatively wide vertical side walls 101 and 102 and relatively narrow end vertical walls 103 and 104 through which the analyzing light beam passes. The top of the cell window is connected by a conduit 105 to the other electrode chamber 106. The liquid under study is allowed to enter the U-shaped vessel from reservoir portion 95 by opening valve 97. A conduit 107 connects the upper portions of the electrode chambers 100 and 106 so as to equalize the level of liquid in the two chambers. The electrodes, not shown, are positioned in the respective electrode chambers 100 and 106.

The cell is preferably made up entirely of transparent material, such as glass, and fused together to form a unitary structure.

Figure 12:
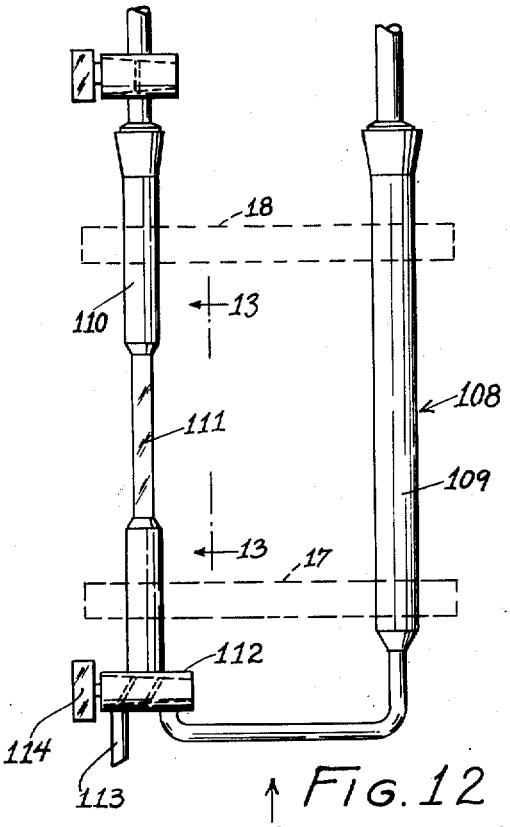
Figure 12 is a front elevational view of a diffusion cell which may be employed to study liquid diffusion phenomena with the apparatus of the present invention.
Figure 13:
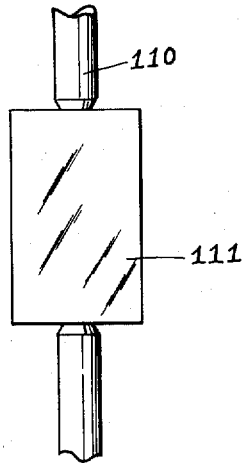
Figure 13 is an enlarged detail view of the window portion of the cell of Figure 12, taken on line 13—13 thereof.
Figure 16:
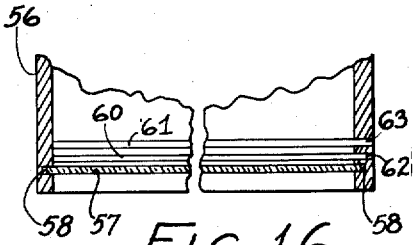
Figure 16 is an enlarged cross-sectional detail view taken on line 16—16 of Figure 5.

In diffusion experiments, a cell such as is disclosed in Figures 12 and 13 is employed. The cell, indicated generally at 108, is generally U-shaped, and comprises a first arm 109 containing one of the liquids, and a second arm 110, containing the other liquid in which the first liquid is to be diffused. Arm 110 includes the cell window portion 111 which is generally similar to the cell window portion 20 described in connection with the electrophoresis cell of Figures 9, 10 and 11. A two-way stop cock 112 is provided at the lower end of arm 110, said stop cock having a drain spout 113. By rotating the handle 114 of the stop cock to one position, liquid from arm 109 may be introduced into arm 110 to form a boundary suitable for diffusion observations. By rotating said handle to a second position the connection to arm 109 may be closed. In a third position of handle 114, arm 110 may be drained through spout 113.

As in the case of the electrophoresis cell, the diffusion cell 108 is preferably made entirely of transparent material, such as glass.

Figure 14:
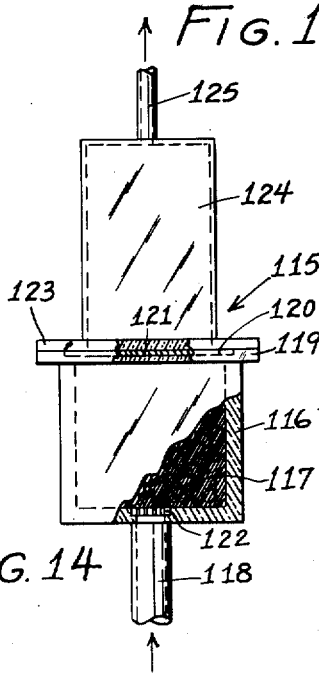
Figure 14 is a side elevational view, partly in cross-section, of an adsorption cell which may be employed to study adsorption phenomena with the apparatus of the present invention.
Figure 15:
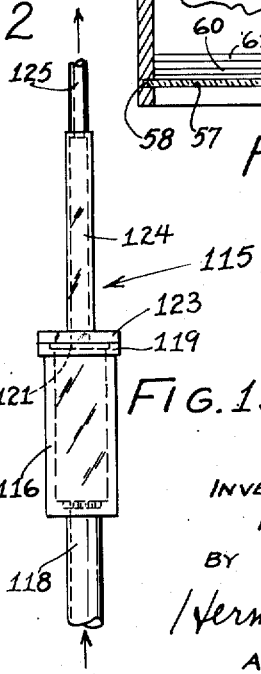
Figure 15 is a front elevational view of the adsorption cell of Figure 14.

In adsorption analysis, a cell such as is shown in Figures 14 and 15 is employed. The cell, indicated generally at 115, comprises a glass bottom compartment 116 containing a mass of adsorbent material 117, such as charcoal, which is connected at its bottom by a conduit 118 to a source of the solution to be examined. The compartment 116 has a top flange 119 which is formed with a seat 120 in which is positioned, a suitable filter 121, such as filter paper or blotting paper. A perforated filter disc 122, preferably of sintered glass fused in position is also provided at the bottom of compartment 116 in the connection to conduit 118. The top surface of flange 119 is mat-ground and is greased with a suitable lubricant, and sealingly engaging said flange is the similarly ground bottom surface of the bottom flange 123 of the glass optical observation window portion 124. The top of window portion 124 is connected by a conduit 125 to a suitable storage receptacle.

The solution to be examined is slowly passed into the cell from the bottom inlet conduit 118. After percolating through the adsorbent mass 117, the solution rises in the optical observation window 124, and the adsorption diagram, having the form of a refractive index gradient curve, is observed or recorded from time to time on photographic plates. It may also be recorded continuously by means of a recording camera of the type having a drum carrying photographic film and revolving slowly past a slit located at the aperture of the camera.

For determinations of refractive index, the solutions to be examined are placed either in 30° or 60° hollow glass prisms. The prism containing the solution under study is supported in the path of the analyzing light beam. The deflection of the light beam caused by the refractive properties of the solution under study may then be observed in relation to a calibrated scale plate inserted in housing 56 behind screen 57. Screen 57, alternatively, may be calibrated directly in terms of reflective index or refractive index increments.

Figures 2, 17:
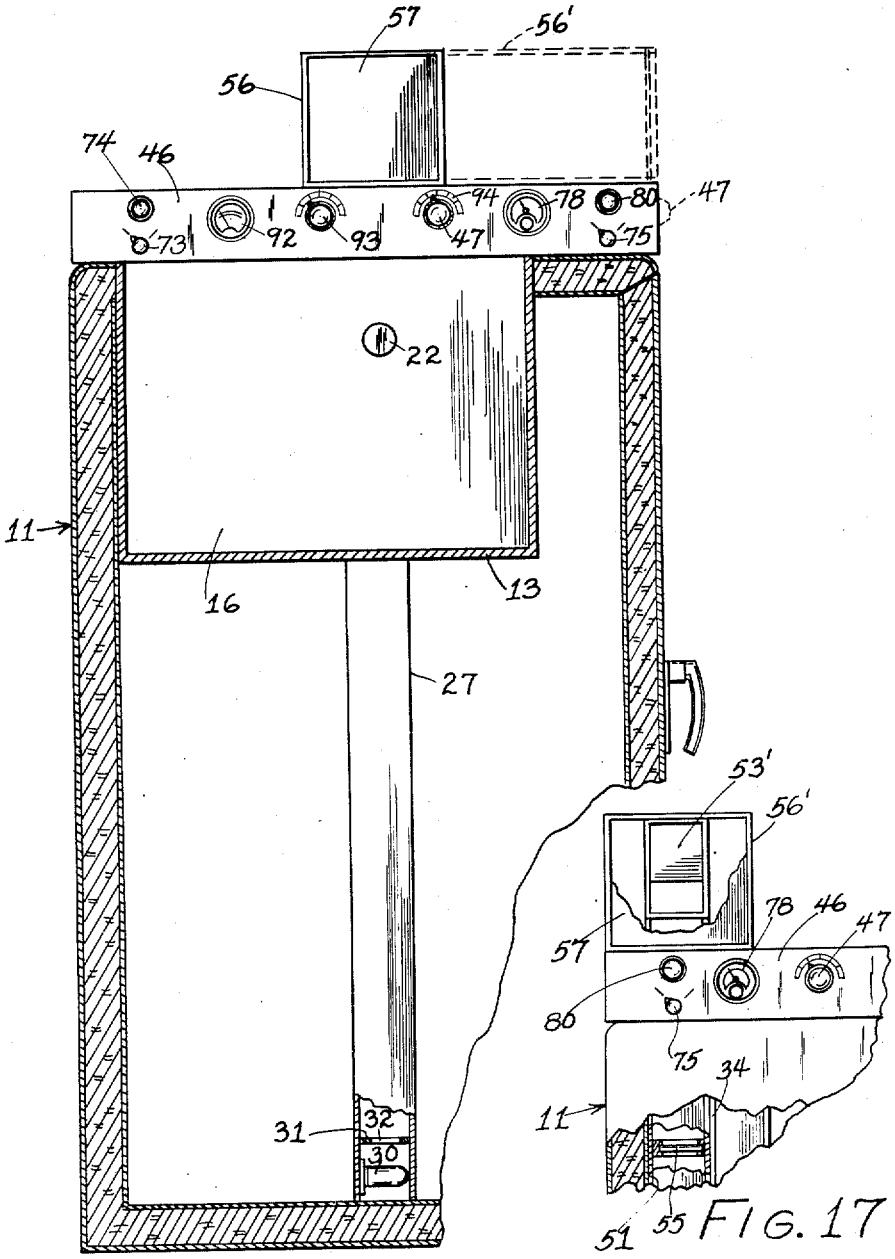
Figure 2 is a cross-secional view taken on line 2—2 of Figure 1.
Figure 17 is a fragmentary detail view showing a modification of the arrangement of Figure 1.
Figure 3:
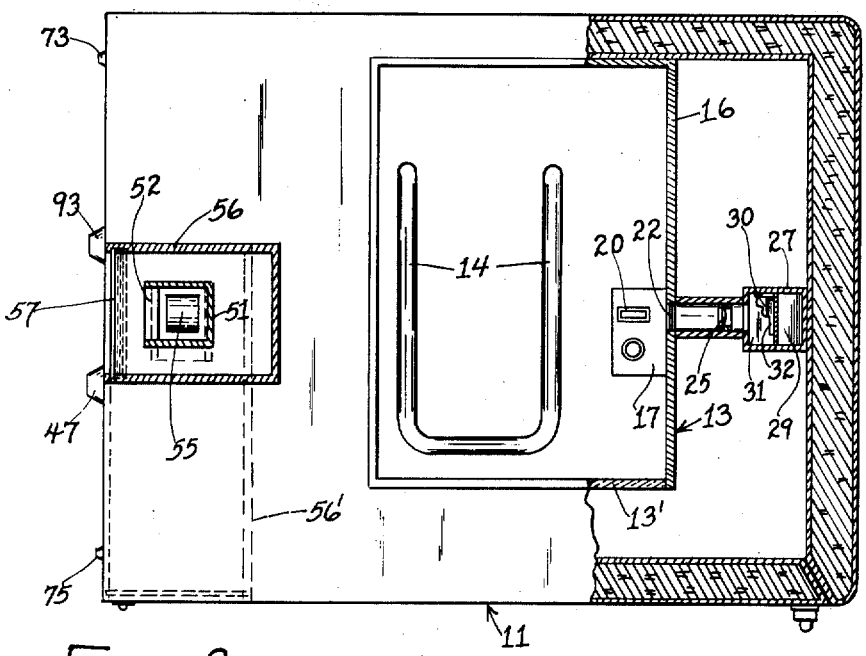
Figure 3 is a cross-sectional view taken on line 3—3 of Figure 1.

The arrangement of the apparatus shown in full line view in Figures 1, 2 and 3 produces a curve in which the base line is vertical, as shown in Figures 8a, 8b and 8c. It is usually more convenient to work with a horizontal base line arrangement. The apparatus may be modified to obtain this preferred arrangement by changing the direction of housing 56 90° from its full line position to extend toward the front instead of toward the side of the refrigerator, as shown in dotted view at 56′ in Figures 2 and 3, and as shown in front elevation in Figure 17. The reorientation of mirror 53 to its new position, indicated at 53′ in Figure 17, rotates the curve, as viewed on screen 57, 90° from its former position and provides the desired horizontal base line. In the preferred embodiment of the apparatus, the control panel 46 also faces toward the front of the refrigerator, as shown in Figure 17, and the operating elements and indicators thereon may be rearranged for convenience from the specific locations thereof disclosed in Figure 7.

The method of use of the apparatus will be now illustrated by describing the steps involved in performing an electrophoresis experiment, when employing a cell of a type shown in Figures 9, 10 and 11.

The solution or biological fluid, for example, blood serum, to be examined is diluted with a suitable buffer, such as sodium barbiturate-barbituric acid solution of about 0.1 ionic strength and hydrogen ion concentration or pH of about 8.6, so as to contain a total colloid or protein concentration of about 1 to 2 percent. Approximately 20 cc. of the diluted solution is equilibrated against about one liter of the same buffer system by dialysis through cellophane in a closed dialyzer placed in the main compartment of the refrigerator. After about 24 hours' dialysis, silver-silver chloride electrodes with a hollow silver tube as stem are placed in the electrode chambers 100 and 106 of the electrophoresis cell and the entire cell, with the exception of the storage container 95 and conduit 96, is filled with the buffer forming the outside solution during dialysis. The storage container 95 is filled with the colloid solution which was inside the cellophane bag of the dialyzer.

The cell is now immersed in the tank 13 and secured in its supporting brackets 17 and 18, the water in the tank being held constant in temperature at or near 1° centigrade by the cooling coil loops 14 of the refrigerator, the compensating heater 8 and the regulating thermostatic switch 9 for said heater. After the cell has assumed the temperature of the bath and some saturated potassium chloride solution has been injected into the electrophoresis electrode stems, the stop cock 97 connecting the main compartment of the cell with the reservoir portions thereof is cautiously opened by means of a suitable elongated key which may be extended downwardly thereto from the top of the tank 13 to engage the handle of the stop cock for rotating same. This manipulation may be observed directly through the transparent front wall 13' of the tank. From time to time the position of the colloid boundary in the window portion 20 of the cell is noted on the viewing screen 57 of the apparatus after switching on the light source 30 for short periods of time. The boundary will appear on the viewing screen as a sharp horizontal line according to the arrangement of Figure 1, or as a vertical line according to the arrangement of Figure 17. When this line coincides with a reference line etched or otherwise marked on the screen, the stop cock 97 of the cell is closed and direct current is passed through the cell by switching on the rectifier circuit. By means of the control instruments situated on the front panel 46 of housing 12 the current strength is adjusted to approximately 12 milliamperes (or any value between 8 and 15 milliamperes). The automatic timer 78 is set for the desired passage of current, for example, for 180 minutes. From then on, the apparatus needs no further attention until the timer shuts off the current, at which time the signal lamp 80 becomes dark, thus warning the operator that the electrophoretic time period has been completed. Upon turning on the light source 30, the fully developed electrophoretic diagram of the liquid under study appears on the viewing screen 57. If the bar section 71 of the adjustable diaphragm is employed the curve is dark against a bright background, and the reverse if the slit section 64 of the diaphragm is employed. The amplitude of the maxima peaks of the curve depends on the angle between the bar or slit and the plane of the light beam impinging on the diaphragm, as above explained. This angle may be varied by operating the knob 47. In the case of a routine specimen, such as blood serum, the operator can readily ascertain whether or not it exhibits the pattern of normal serum by inserting in the slot 63 a slide carrying the standard diagram of normal serum, representing the average curve obtained from a sufficiently large number of normal serum samples. The nature of the visual comparison is indicated by the superimposed patterns of Figure 8c. The adjustable diaphragm is set for the same angle as the standard curve. Since the area under the peaks of the curve is a function of the protein concentration, a hyper- or hypoproteinemia expresses itself in a larger or smaller pattern, as the case may be, than covered by the standard curve. By adjusting the angle of the diaphragm until the experimental curve coincides with the standard curve as well as it may be fitted thereto, the operator may readily determine with substantial accuracy the protein content of the specimen under study with the aid of a calibration chart on which the angle of the diaphragm, as read from the scale 94 on the control panel, is plotted graphically against total protein concentration. If the curve given by the experimental liquid differs only in certain regions of the diagram, for example, in gamma globulin or albumin concentration, it is possible to estimate from the normal pattern for normal serum the extent of deviation with the aid of specially prepared standard curves representing sera with varying concentrations of the different protein components. If the experimental curve differs radically in its appearance from that given by normal blood serum, the operator can determine whether he is dealing with a case of nephritis, multiple myeloma, or some other disease known to give a characteristic anomalous pattern by comparing the experimental diagram with various comparison curves which may be furnished with the apparatus in the form of slides which may be inserted behind the screen 57 in place of the standard diagram for normal serum. For purposes of record, the experimental diagram may either be traced by hand on a prepared transparent graph sheet or it may be recorded on a photographic plate. Special photographic paper may be employed which is insensitive to diffuse daylight but sensitive to the radiation of the light source 30, and all operations including developing and fixing may be carried out without a special darkroom. The photographic process employed may be similar to the "instantaneous one-step photography" recently described by Edwin H. Land, which yields direct positive prints of images without the use of darkroom facilities or subsequent chemical treatment of the exposed film or paper.

For the determination of diffusion constants a cell of the type illustrated in Figures 12 and 13 is employed. The solution of the substance to be studied is carefully stratified under pure solvent in a manner similar to that outlined for the electrophoresis procedure. No electric current is passed through the cell but the spontaneous progressive blurring of the initially sharply defined boundary between solution and solvent with time due to free diffusion is recorded by tracing or by photographing the gradient curve visible on the viewing screen at suitable intervals.

From the above description it is obvious that the present invention is applicable to a wide range of phenomena or processes involving changes in refractive index or in refractive index gradients. By rigidly standardizing the technique employed in using the apparatus, the results obtained by different operators and in different laboratories can be made directly comparable and accurately reproducible.

While certain specific embodiments of the apparatus have been disclosed in the above description, it will be understood that various modifications within the scope of the invention may occur to those skilled in the art. Therefore it is intended that no limitations be placed on the invention other than as defined by the scope of the appended claims.

What is claimed is:

1. An apparatus for optically producing a curve showing the refractive index gradients in a liquid, comprising a chamber, means for maintaining said chamber at substantially zero [relative] humidity, radiation channelling means in said chamber defining an optic path having a *folded* [connected] axial plane, a line source of radiant energy in said chamber located in the axial plane of said optic path, means for supporting a column of liquid in said optic path with said axial plane intersecting the column transverse to the longitudinal axis thereof, means for projecting radiation from said source along said axial plane in the form of a relatively flat beam impinging transversely across said column, a diaphragm, means for supporting said diaphragm in the optic path and in the path of emergent radiation from said column, said diaphragm having a radiation-intercepting element which is angularly crossed with respect to said axial plane, and a cylindrical lens in the optic path and in the path of the radiation transmitted through said diaphragm, said cylindrical lens being oriented with its longitudinal axis at right angles to said axial plane, so as to amplify the deviation of the rays of the transmitted radiation caused by their passage through regions of the liquid column having refractive index gradients.

2. In an apparatus for optically analyzing a liquid having refractive index gradients by the crossed-slit method, a chamber, light-channelling means in said chamber defining an optic path having a connected axial plane, means for supporting the liquid in said optic path with said axial plane intersecting the liquid, a line source of light in the axial plane of said optic path, a diaphragm in said optic path, said diaphragm having a slit which is angularly crossed with respect to said axial plane, means in said chamber for projecting a relatively flat beam from said source along said axial plane through the liquid and then across said slit, a cylindrical lens in the optic path and in the path of light transmitted through the slit, the cylindrical lens being oriented with its longitudinal axis substantially at right angles to said axial plane, and means for adjusting the angular position of the diaphragm slit with respect to said axial plane.

3. An apparatus for the electrophoretic analysis of liquids, comprising a chamber, radiation-channelling means in said chamber defining an optic path having a connected axial plane, an electrophoresis cell having a longitudinal window portion, means for supporting said cell in the optic path with said axial plane intersecting said window portion transversely of the longitudinal axis of the cell, means for applying an electrical potential to the cell, a line source of radiant energy located in said axial plane, means in the chamber for projecting radiation from said source in the form of a relatively flat beam along said axial plane transversely across said window portion, a diaphragm interposed in said optic path and in the path of the emergent radiation from said window portion, said diaphragm having a narrow substantially linear radiation-separating element which is angularly crossed with respect to said axial plane, and a cylindrical lens in said optic path beyond said diaphragm, said lens being oriented with its longitudinal axis substantially at right angles to said axial plane.

4. An apparatus for optically producing a curve showing the refractive index gradients in a liquid, comprising a chamber, radiation-channelling means in said chamber defining an optic path having a connected axial plane, a line source of radiant energy located in said axial plane, means for supporting a column of liquid to be analyzed in said optic path with said axial plane transversely intersecting said column, means in the chamber for projecting radiation from said source along said axial plane in the form of a relatively flat beam impinging transversely across the column, a diaphragm, means for supporting said diaphragm in said optic path and in the path of emergent radiation from said column, said diaphragm having a narrow, substantially linear radiation-separating element which is angularly crossed with respect to said axial plane, and a cylindrical lens beyond the diaphragm in said optic path and in the path of the radiation transmitted through the diaphragm, the cylindrical lens being oriented with its longitudinal axis substantially at right angles to said axial plane.

5. An apparatus for optically producing a curve showing the refractive index gradients in a liquid, comprising a chamber, radiation-channelling means in said chamber defining an optic path having a connected axial plane, a line source of radient energy located in said axial plane, means for supporting a column of liquid to be analyzed in said optic path with said axial plane transversely intersecting said column, means in said chamber for projecting radiation from said source along said axial plane in the form of a relatively flat beam impinging transversely across the liquid column, a diaphragm in the optic path and in the path of the radiation emerging from the column, said diaphragm being formed with a slit which is angularly crossed with respect to said axial plane, means for angularly adjusting the diaphragm in its own plane so that the slit may be crossed in selected angular positions with respect to said axial plane, and a cylindrical lens beyond said diaphragm in the path of the radiation transmitted through the slit, said cylindrical lens being oriented with its longitudinal axis substantially at right angles to said axial plane.

6. An apparatus for analyzing liquids by detecting refractive index gradients therein, comprising a chamber, means for maintaining said chamber at substantially zero [relative] humidity, light-channelling means in said chamber defining an optic path having a connected axial plane, a line source of light in said chamber located in the axial plane of said optic path, means for supporting a column of liquid to be analyzed in said optic path with said axial plane extending transversely to the longitudinal axis of said column, means for projecting light from said line source along said axial plane in the form of a relatively flat beam impinging transversely across said column, a diaphragm, means for supporting said diaphragm in the optic path and in the path of emergent light from said column, means coupled to the diaphragm and extending through the wall of the chamber for adjusting the position of said diaphragm from outside the chamber, said diaphragm having a light-intercepting element which is angularly crossed with respect to said axial plane, and a cylindrical lens in the optic path and in the path of the light transmitted through said diaphragm, said cylindrical lens being oriented with its longitudinal axis at right angles to said axial plane, so as to amplify the deviation of the rays of the transmitted light caused by refractive index gradients in the liquid column.

7. An apparatus for the electrophoretic analysis of liquids, comprising a chamber, means for maintaining said chamber at substantially zero [relative] humidity, radiation-channelling means in said chamber defining an optic path having a *folded* [connected] axial plane, a vessel in said chamber, liquid in said vessel, means for maintaining said liquid at constant temperature, an electrophoresis cell supported in said liquid, said cell having a longitudinally extending window portion, means for applying an electrical potential to the cell, said axial plane transversely intersecting said cell at said window portion, a line source of radiant energy in said chamber, located in the axial plane of said optic path, means for projecting radiation from said source along said axial plane in the form of a relatively flat beam impinging transversely across said window portion, a diaphragm, means for supporting said diaphragm in the optic path and in the path of emergent radiation from said window portion, said diaphragm having a radiation-intercepting element which is angularly crossed with respect to said axial plane, and a cylindrical lens in the optic path and in the path of the radiation transmitted through said diaphragm, said cylindrical lens being oriented with its longitudinal axis at right angles to said axial plane, so as to amplify the deviation of the transmitted radiation caused by refractive index gradients in the liquid in said window portion.

8. In an apparatus for optically analyzing liquids having refractive index gradients by the crossed-slit method, a chamber, means for maintaining said chamber at substantially zero [relative] humidity, light-channelling means in said chamber defining an optic path having a connected axial plane, a line source of light in said chamber located in the axial plane of said optic path, a diaphragm in said chamber located in said optic path, said diaphragm comprising a circular disc having a radial light-intercepting element, means for rotatively supporting said diaphragm, said axial plane being spaced from the axis of rotation of the diaphragm, means in said chamber for projecting a relatively flat beam from said line source along said axial plane and across said light-intercepting element, and a cylindrical lens in the path of light transmitted through said diaphragm and being oriented with its longitudinal axis at right angles to said axial plane.

9. In an apparatus for optically analyzing liquids having refractive index gradients by the crossed-slit method, a chamber, means for maintaining said chamber at substantially zero [relative] humidity, light-channelling means in said chamber defining an optic path having a connected axial plane, a line source of light in said chamber located in the axial plane of said optic path, a diaphragm in said chamber located in said optic path, said diaphragm comprising a circular disc having a radial light-intercepting element, means for rotatively supporting said diaphragm, said axial plane being spaced from the axis of rotation of the diaphragm, means in said chamber for projecting a relatively flat beam from said line source along said axial plane and across said light-intercepting element, a cylindrical lens in the path of light transmitted through said diaphragm and being oriented with its longitudinal axis at right angles to said axial plane, and means coupled to the diaphragm and extending outside the chamber for rotating the diaphragm to vary the angle of intersection between said beam and said light-intercepting element.

10. An electrophoresis apparatus comprising a chamber, means for refrigerating said chamber, light-channelling means in said chamber defining an optic path having a connected axial plane, a vessel in said chamber, liquid in said vessel, means for maintaining said liquid at constant temperature, an electrophoresis cell supported in said liquid, said cell having a longitudinally extending window portion, means for applying an electrical potential to the cell, said axial plane transversely intersecting said cell at said window portion, a line source of light in said chamber located in the axial plane of said optic path, means in said chamber for projecting a relatively flat beam from said source along said axial plane transversely of the axis of the cell across said window portion, a diaphragm in said chamber located in said optic path, said diaphragm comprising a disc having a radial light-intercepting element, means for rotatively supporting said diaphragm, said axial plane being spaced from the axis of rotation of the diaphragm, means for projecting the beam emergent from the cell across said light-intercepting element, a cylindrical lens in said chamber in the path of light transmitted through said diaphragm and being oriented with its longitudinal axis at right angles to said axial plane, light-detecting means in the path of light emergent from said cylindrical lens, and means in said chamber for projecting an image of said cell window portion on said light-detecting means, said last named projecting means being formed and arranged to define a conjugated system with the cylindrical lens, said conjugated system being focussed on the plane of the diaphragm.

11. The structure of claim 10, and wherein said light-intercepting element is a bar.

12. The structure of claim 10, and wherein said light-intercepting element is a straight edge.

13. The structure of claim 10, and wherein said light-intercepting element is defined by a radial slot in said disc.

14. In an electrophoresis apparatus, a chamber, means for refrigerating said chamber, light-channelling means in said chamber defining an optic path having a connected axial plane, a vessel in said chamber, liquid in said vessel, means for maintaining said liquid at constant temperature, an electrophoresis cell supported in said liquid, said cell having a longitudinally extending window portion, means for applying an electrical potential to the cell, said axial plane transversely intersecting said cell at said window portion, a line source of light in said chamber located in the axial plane of said optic path, means in said chamber for projecting a relatively flat beam from said line source along said axial plane transversely of the axis of the cell across said window portion, a diaphragm in said chamber located in said optic path, said diaphragm comprising a circular disc having a radial light-intercepting element, means for rotatively supporting said diaphragm, said axial plane being spaced from the axis of rotation of the diaphragm, means for projecting the beam emergent from the cell across said light-intercepting element, a cylindrical lens in said chamber in the path of light transmitted through said diaphragm and being oriented with its longitudinal axis at right angles to said axial plane, light-detecting means in the path of light emergent from said cylindrical lens, means in said chamber for projecting an image of said cell window portion on said light-detecting means, said last named projecting means being formed and arranged to define a conjugated system with the cylindrical lens, said conjugated system being focussed on the plane of the diaphragm, and means coupled to the diaphragm and extending outside the chamber for rotating said diaphragm to vary the angle of intersection of the beam emergent from the cell and said radial light-intercepting element, whereby the light rays transmitted through the cylindrical lens define on said light-detecting means a continuous curve characteristic of the refractive index gradients in the liquid contained in the window portion of the electrophoresis cell.

*15. In an apparatus for optically analyzing a liquid having refractive index gradients by the crossed-slit method, a chamber, means for maintaining said chamber at substantially zero humidity, light-channelling means in said chamber defining an optic path having a folded axial plane, means for supporting the liquid in said optic path*

*with said axial plane intersecting the liquid, a line source of light in the axial plane of said optic path, a diaphragm in said optic path, said diaphragm having a slit which is angularly crossed with respect to said axial plane, means in said chamber for projecting a relatively flat beam from said source along said axial plane through the liquid and then across said slit, a cylindrical lens in the optic path and in the path of light transmitted through the slit, the cylindrical lens being oriented with its longitudinal axis substantially at right angles to said axial plane, and means for adjusting the angular position of the diaphragm slit with respect to said axial plane.*

KURT G. STERN.

References Cited in the file of this patent or the original patent

UNITED STATES PATENTS

| Number | Name | Date |
|---|---|---|
| 1,811,770 | Wheeler | June 23, 1931 |
| 1,907,558 | Newman | May 9, 1933 |
| 2,067,262 | De Montigmir et al. | Jan. 12, 1937 |
| 2,211,628 | Pineo | Aug. 13, 1940 |
| 2,253,049 | Riche | Aug. 19, 1941 |
| 2,268,139 | Hansen | Dec. 30, 1941 |
| 2,335,659 | Fraenckel et al. | Nov. 30, 1943 |
| 2,403,986 | Lacy | July 16, 1946 |
| 2,408,512 | Gradisar | Oct. 1, 1946 |
| 2,412,602 | Chambers et al. | Dec. 17, 1946 |
| 2,421,476 | Belar et al. | June 3, 1947 |
| 2,425,758 | Saunders | Aug. 19, 1947 |